Patented Nov. 21, 1933

1,935,754

UNITED STATES PATENT OFFICE 1,935,754

PROCESS FOR THE PRESERVATION OF GREEN CATTLE FODDER

Artturi Ilmari Virtanen, Helsinki, Finland

No Drawing. Application January 31, 1930, Serial No. 425,075, and in Finland February 16, 1929

3 Claims. (Cl. 99—11)

One of the most important, if not the most important agricultural problems at the present time is the discovery of a process to preserve green cattle fodder in such a state that it will, as much as possible, retain its original nourishing value and aroma. From the same acreage, where the hay is now harvested air dried, it would be possible to obtain a double amount of fodder units, if only the fodder could be moved several times during the season some three or four weeks old.

The preparation of ordinary silage is an attempt to accomplish the above end. With the methods known and used up to date, it has not, however, been possible to prevent the fodder from losing a considerable portion of its food value, either by respiration or especially by the fermentation caused by micro-organisms.

The butyric acid bacillus, which comes into the fodder with particles of the soil, will also multiply, rendering the pressed fodder practically valueless for cheese dairy milk production.

Since 1925 I have carried out researches, to determine at which hydrogen ion concentration the reactions, usually taking place in the ordinary silage, will cease. The researches have clearly disclosed, that at a hydrogen ion concentration of pH4, the fodder will not lose hardly anything from its nourishing value. At the same time I made the discovery, that the butyric acid bacillus will not multiply in said acidity. On the contrary, even the spores will die in this acidity in the course of some length of time. Thereby, the fact has been established that in case the fodder immediately after the mowing, by addition of acidity, is made so acid, that its pH is about 4, the fodder will be preserved practically unchanged. It remained only to be found out, what acids, as to their price and physiological properties could be advantageously applied in the process, and whether the acid could be mixed homogeneously in a practical way with the fodder, and whether the fodder thus prepared possesses such a taste and smell as to be eaten by the animals with relish. Some minor experiments in accordance with this new process were carried out as early as in the summer of 1926 with hydrochloric acid, sulphuric acid, lactic acid and bisulphate of sodium. The acids were added to the fodder in concentrated solutions of some 7 to 15 per cent concentration.

The experiments carried out on a small scale proved thus from the very beginning that the fodder is preserved exceeding well by the addition of some suitable acid. On account of the varying coefficient of dissociation of different acids, these must be added correspondingly in different quantities. On this account weak acids can hardly be used alone.

Experiments carried out on a more extensive scale proved that the process could be practically applied and that it was quite possible to mix homogeneously the acid with the fodder. As the water content of fresh mowed green fodder is about 80 per cent, it is not advisable to add much water thereto. For this reason, the acid should be added in a concentrated or 1 to 20 per cent solution. When experimenting on a large scale, the fodder was preserved in silos or ground pits. In both cases the preservation of the fodder was equally good. For instance, young clover was, after a three to four months storage, of greenish colour and its odour remained one of freshly mowed hay. A chemical analysis showed that the ammonium contents were not in excess of 1 to 3 per cent. The albumens accordingly were not decomposed in a noticeable degree. Only the presence of amino acids was more marked. Butyric acid was not to be found at all. The presence of butyric acid bacillus could not be discovered by bacteriological investigation. Lactic acid and acetic acid were present to a certain degree. The ash reaction showed a strongly basic character.

During the feeding experients Ayrshire cattle got a daily portion of some 45 to 70 kilogrammes and Finnish domestic cattle 20 to 30 kg. per day of this new fodder, the dry matter content of which was about 20 per cent. The cows ate the fodder with relish. The experiments proved also, that of the fodder prepared from young clover, some 5.5 to 6 kg. were needed to make one fodder unit. Its nourishing value was accordingly equal to that of freshly cut clover. It entirely substitutes power fodder given to cows, the yearly milk output of which was 4000 kg.

In addition to fresh hay or green fodder, experiments have also been carried out with beet tops, fodder beets, and sugar beet slices. Even these stuffs preserved their food value well, when treated according to the above described process.

I claim:

1. The method of preserving green fodder, comprising treating fresh fodder when storing it in silos or pits as homogeneously as possible with materials selected from the group consisting of hydrochloric, and sulphur acids, mixtures of said acids, salts of said acids, and mixtures of said acids and said salts, in such quantities that the hydrogen ion concentration of the fodder mass will be raised immediately at the beginning of the storage to a pH-range between pH 3-4.

2. The method of preserving green fodder, comprising treating fresh fodder when storing it in silos or pits, as homogeneously as possible with materials of from 1 to 20% concentration, selected from the group consisting of hydrochloric and sulphuric acids, mixtures of said acids, solutions of salts of said acids, and mixtures of said acids and said solutions of salts, in such quantities that the hydrogen ion concentration of the fodder mass will be raised immediately at the beginning of the storage to a pH range between pH 3-4.

3. The method of preserving green fodder, comprising treating fresh fodder when storing it in silos or pits as homogeneously as possible with materials selected from the group consisting of hydrochloric, and sulphuric acids, mixtures of said acids, salts of said acids, and mixtures of said acids and said salts, in such quantities that the hydrogen ion concentration of the fodder mass will be raised immediately at the beginning of the storage to a pH range between pH 3-4, the acids being added in concentration from 1 to 20%, and the acid salts being added in solid state.

ARTTURI ILMARI VIRTANEN.